United States Patent [19]
Yang et al.

[11] Patent Number: 5,456,892
[45] Date of Patent: Oct. 10, 1995

[54] NITROGEN OXIDE DECOMPOSITION

[76] Inventors: Ralph T. Yang, 19 Pine Ct., Williamsville, N.Y. 14221; Ning Chen, 12 W. Cleveland Dr., Buffalo, N.Y. 14215

[21] Appl. No.: 222,462

[22] Filed: Apr. 1, 1994

[51] Int. Cl.⁶ .................................................. C01B 21/20
[52] U.S. Cl. ........................................................ 423/239.1
[58] Field of Search .................... 423/239.1; 502/209, 502/210, 211, 213

[56] References Cited

U.S. PATENT DOCUMENTS 3,953,575  4/1976  Gidaspow et al. ................. 423/212

OTHER PUBLICATIONS

Mochida et al. "Catalytic Activities of 12–Molybdophosphoric Acid . . . for the Reduction of Nitrogen Monoxide" Jun., 1984 Bull. Chem. Soc. Jpn pp. 1449–1453.

*Primary Examiner*—Michael Lewis
*Assistant Examiner*—Thomas G. Dunn, Jr.

[57] ABSTRACT

Methods of reducing $NO_x$ to nitrogen without using a reducing gas. The $NO_x$ is absorbed in a heteropoly compound to concentrate it and then heated to reverse the fixation reaction(s) and decompose the $NO_x$ into nitrogen.

22 Claims, 4 Drawing Sheets

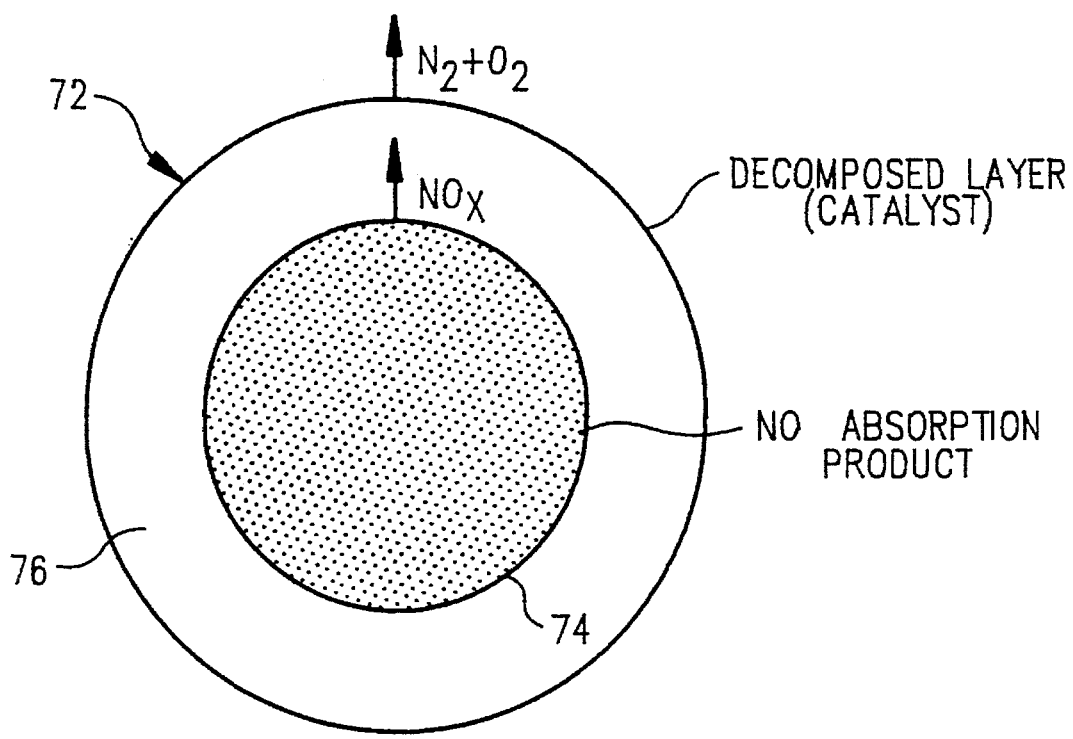

5,456,892

NITROGEN OXIDE DECOMPOSITION

TECHNICAL FIELD OF THE INVENTION

The present invention relates to novel, improved methods for decomposing nitrogen oxides to nitrogen and to absorbent/catalysts for those methods.

The principles of the present invention can be employed to particular advantage to remove nitrogen oxides from the stack gases generated in utility boiler and other fuel-fired systems. The principles of the present invention will accordingly be developed primarily with reference to such application of the invention. It is to be understood, however, that this is being done for the sake of brevity and clarity and is not intended to limit the scope of the invention as defined in the appended claims.

BACKGROUND OF THE INVENTION

Nitrogen oxides ($NO_x$) are major environmental pollutants. Nitric oxides, although unstable, exhibit a high resistance to decomposition. There has as a consequence been a continuing search for catalysts capable of facilitating the decomposition of nitrogen oxides, and this search dates back to the beginning of the twentieth century.

The most active of the $NO_x$ decomposition catalysts that have been identified are noble metals and oxides of transition metals. However, it is impractical to use such catalysts in applications such as the decomposition of nitrogen oxides in post-combustion flue gases and other high temperature gas streams. One reason is that flue gases invariably contain oxygen and sulfur dioxide. Oxygen has a strong inhibiting effect on the catalytic activity of noble metals and transition metal oxides, and sulfur dioxide is a strong catalyst poison. In addition, there are typically very few locations in a system at which stack gases and other exhaust streams can be treated as a practical matter. In a utility boiler system, for example, there are only two convenient locations for a nitrogen oxide-decomposing catalytic reactor, one after the economizer and the other in the path between the air preheater and the exhaust stack inlet. The respective temperatures of the gases at these locations are approximately 350°–450° C. and 100°–150° C. At these temperatures, noble metal and transition metal oxide catalysts are not active enough to be of practical value.

Selective catalytic reduction (SCR) technology has been widely accepted for the post-economizer, 350°–450° C. decomposition of nitrogen oxides. In this technology, ammonia is used as a reducing agent with a $V_2O_5/TiO_2$ catalyst or a $WO_3 + V_2O_5/TiO_2$ catalyst.

The low temperature window (100°–150° C.) in the air preheater/stack inlet path presents an economically more attractive alternative for the selective catalytic reduction of nitrogen oxides; and catalysts usable in low temperature SCR processes have been found. These include supported platinum, iron nickel sulfates, amorphous chromia, $Nb_2O_5 + V_2O_5/TiO_2$, and manganese oxides. However, because of the low concentrations of nitrogen oxides in the settings which they are found, the direct, catalytically promoted decomposition of nitrogen oxides at mild temperatures (below 600° C.) without the use of a reducing gas results in low decomposition rates. As a consequence, and despite the large number of catalysts that have been found to decompose nitrogen oxides, efforts to directly decompose those pollutants without using reducing gases have been essentially abandoned.

Consequently, there is an existing and continuing need for a nitrogen oxide decomposition process which overcomes the problems posed by the low concentrations in which polluting nitrogen oxides are typically found.

SUMMARY OF THE INVENTION

The barrier to the direct catalytic decomposition of nitrogen oxides is solved in accord with the principles of the present invention by employing a two-step process in which the nitrogen oxide is first concentrated in a bulk solid phase by absorption at low temperature into an appropriate sorbent/catalyst. The catalyst and its sorbed burden of nitrogen oxide in the form of nitrate, nitrite, or chemically bonded $NO_x$ is then rapidly heated to a higher temperature to reverse the $NO_x$ fixation reaction and cause the $NO_x$ to penetrate through an outer product catalyst layer of each sorbent/catalyst particle to decompose the $NO_x$ to nitrogen. During decomposition, the partial pressure of $NO_x$ within the sorbent/catalyst particle is on the order of one atmosphere. The high partial pressure within the particle results in $NO_x$ decomposition rates which are 3–4 orders of magnitude (for first-order kinetics) or 6–8 orders of magnitude higher (for second-order kinetics) than those obtained by directly contacting the flue gas on the same catalyst.

The elimination of the need for the ammonia commonly employed as the reducing gas in catalytically promoted $NO_x$ decomposition processes is also important. Ammonia is expensive and an environmental pollutant released by slippage in SCR processes; and it is highly corrosive in the presence of moisture.

Yet another important advantage of the present invention is that the temperatures required for the $NO_x$ absorption step and for rapid heating in the subsequent decomposition step are conveniently available in utility boiler and other systems which generate $NO_x$-containing effluents.

The objects, features, and advantages of the invention will be apparent to the reader from the foregoing and the appended claims and as the ensuing detailed description and discussion proceeds in conjunction with the accompanying drawings.

BRIEF DESCRIPTION OF THE DRAWINGS

FIG. 2 is a pictorial representation of a sorbent/catalyst particle showing how sorbed $NO_x$ migrates through a product catalyst layer to achieve a high rate of decomposition in the second step or stage of the process;

DETAILED DESCRIPTION OF THE INVENTION

As discussed above, the present invention is a novel method which makes it possible to decompose $NO_x$ environmental pollutants to relatively harmless nitrogen without a reducing gas. Decomposition is accomplished by a two-step approach in which the $NO_x$ is first concentrated by a heteropoly sorbent/catalyst at a relatively low temperature and then rapidly heated to a higher temperature to reverse the absorption reaction and catalytically decompose the sorbed $NO_x$ by the same heteropoly compound.

The heteropoly compounds which are useful for the purposes of the present invention are those with one of the following formulas:

$$Y_n XM_{12}O_{40} \quad (1)$$

or $$X_n XM_{12}O_{40} \cdot mH_2O \quad (2)$$

where:

X is phosphorous, arsenic, silicon, germanium, or boron;

M is tungsten, molybdenum, vanadium, or cobalt;

Y is hydrogen or an alkali metal;

n is the number of positive charges required to balance the negative charge of $XM_{12}O_{40}$; and m is 3 to 12.

The $NO_x$ is absorbed in the heteropoly sorbent/catalyst at a temperature in the range of 50° to 200° C. to concentrate the $NO_x$. Then, the sorbent/catalyst is rapidly heated at a rate of at least 20° C./min to a temperature in the range of 250° to 550° C. to catalytically decompose the absorbed $NO_x$ to nitrogen. As mentioned above, these temperatures are conveniently available in utility boiler and other systems which generate effluents containing $NO_x$ effluents.

Absorption of the $NO_x$ in the heteropoly compound requires that oxygen be present, at least in the absorption step of the process. Oxygen in concentrations of 2 percent or higher has a strong positive effect on $NO_x$ absorption. Concentrations beyond 5 percent may increase the NO absorption but only slightly.

Water vapor is also a requisite to the absorption of the nitrogen oxide in the heteropoly compound. Only a very small amount of water—2 to 5 percent—is needed to sustain the nitrogen oxide absorption.

Figure 1:
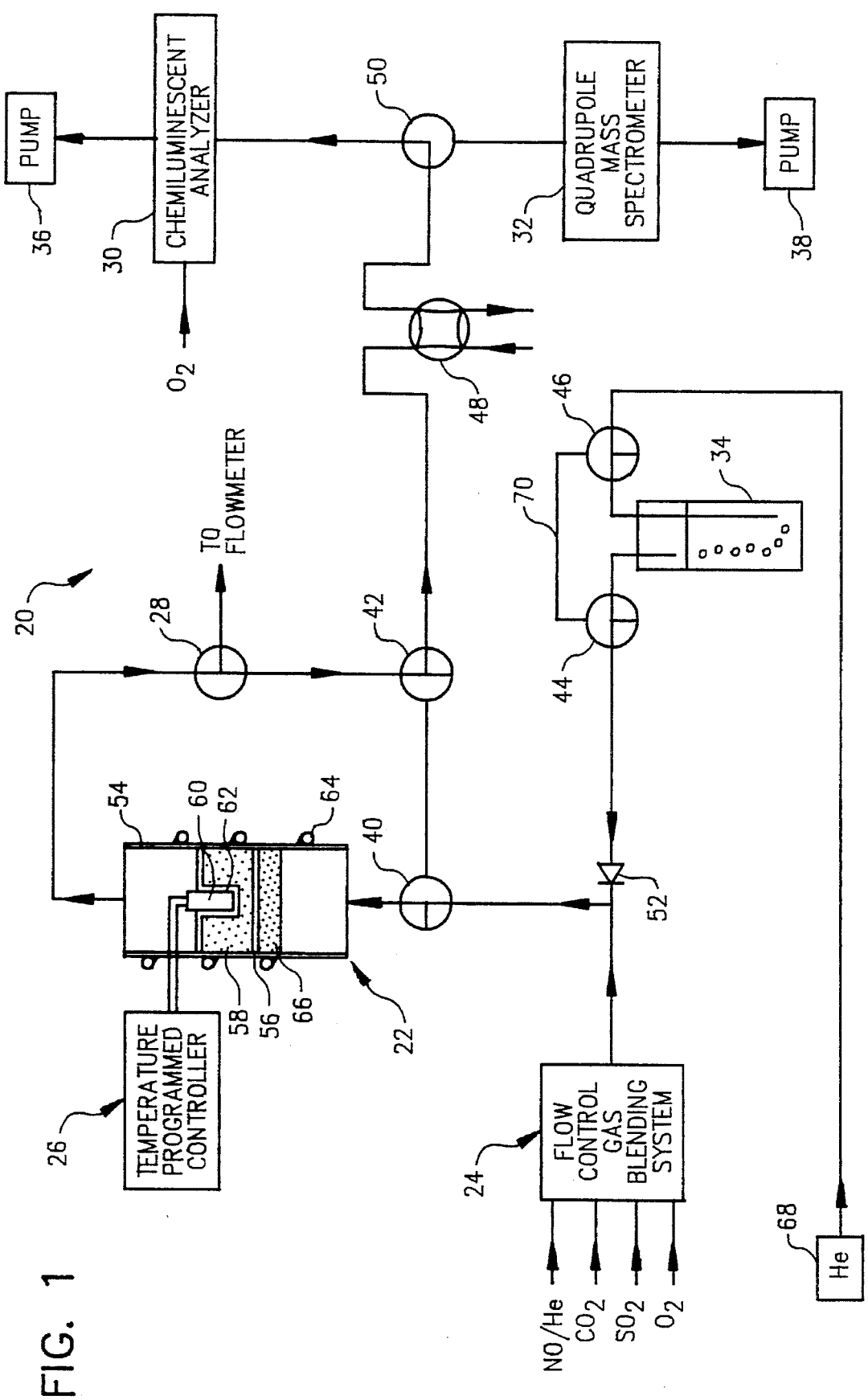
FIG. 1 is a schematic diagram of one system for sorbing and then catalytically decomposing nitrogen oxides to nitrogen in accord with the principles of the present invention.

Referring now to the drawing, FIGS. 1 and 2 depict a representative system 20 which may be employed as just described to convert nitrogen oxides to relatively harmless nitrogen with a heteropoly sorbent/catalyst in accord with the principles of the present invention.

The major components of system 20 include a reactor 22 and a mass flow control and blending system 24. The latter supplies a reactant mixture to reactor 22.

Also included in system 20 is a programmable temperature controller 26. This piece of equipment controls the temperature at which the nitrogen oxide sorption and decomposition steps of the present invention are carried out in reactor 22.

In the interest of gathering data demonstrating the efficiency of the present invention, system 20 was instrumented with a flowmeter 28, a chemiluminescent $NO_x$ analyzer 30, and a quadrupole mass spectrometer 32.

Other major components of system 20 are a water vapor generator 34 which may be a heated gas wash bottle, pumps 36 and 38 for pumping gases from reactor 22 to chemiluminescent analyzer 30 and spectrometer 32, and valves 40 . . . 50 plus a check valve 52 for controlling the flow of gases and water vapor to and through system 20.

Reactor 22 includes a quartz tube 54 with a fritted support 56 for a bed 58 of the heteropoly sorbent/catalyst. The reactor is equipped with a thermocouple 60 located in a well 62 in the bed 58 of heteropoly compound, heating coils 64 surrounding quartz tube 54, and a preheating section 66 located below fritted support 56. The preheating section consists of a nichrome heating coil (not shown) embedded in quartz chips and is used only for rapid heating during the decomposition step of the process. Temperature controller 26 regulates the operation of heating coils 64 and the nichrome coil in preheating section 66, and the temperature of the heteropoly compound during the absorption and decomposition steps of the process is measured by thermocouple 60 and fed back to controller 26.

The feed gas—$NO_x$ mixed with a helium carrier and other gases such as oxygen, carbon dioxide, and sulfur dioxide—is prepared in full control/blending system 24 which may be a Linde Division FM 4575 mass flow control blending system. For evaluation purposes and testing, the $NO_x$ may be a nitrogen oxide/helium preblend.

Valve 40 is adjusted as shown in FIG. 1 to input the feed gas to reactor 22. Prior to this being done, the system 20 can be flushed in the interest of obtaining accurate measurements with helium supplied from a source identified in FIG. 1 by reference character 68. In this step, valves 44 and 46 are adjusted to bypass water vapor generator 34 through line 70. Thereafter, valves 44 and 46 are configured as shown so that the helium from source 68 will pass through water vapor generator 34. By thus incorporating the water vapor in a volume of helium gas, the amount of water vapor supplied to reactor 22 can be much more accurately controlled.

As discussed above, reactor 22 is operated at a relatively low temperature in the initial stage of the decomposition process to concentrate the $NO_x$ in the feed gas from a concentration typically measured in hundreds of parts per million (ppm) into a bulk solid phase where the $NO_x$ partial pressure is on the order of one atmosphere. This allows one to take advantage of the kinetic law of catalyzed $NO_x$ decomposition (which is either first or second order with respect to $NO_x$ partial pressure) in the subsequent decomposition step. The following reaction is typical of those which take place in bed 58 in the absorption step of the decomposition process:

$$H_3PW_{12}O_{40} \cdot 6H_2O \xrightarrow[50-200°\text{ C.}]{NO/O_2} H_3PW_{12}O_{40} \cdot 3NO_x$$

Gases discharged from reactor 22 during the absorption step are pumped by pump 36 through valve 28 to a flowmeter (not shown) employed in assessing the performance of system 20 and through valve 28, valve 42, vent valve 48, and valve 50 to chemiluminescent analyzer 30, which may be a Thermal Electron Corporation Model 10. This analyzer is employed to measure the concentration of $NO_x$ in the reactor effluent. Straightforward mathematical calculations allow the amount of absorbed $NO_x$ to be determined from this measured amount.

In the subsequent, catalytically promoted $NO_x$-to-nitrogen decomposition step, the nichrome heater in reactor preheating section 66 is energized along with external heating coil 64, and the sorbent/catalyst in bed 58 with its burden of absorbed nitrogen is heated as rapidly as possible to reverse the absorption reactions and catalytically decompose the absorbed $NO_x$ to nitrogen. Nitrogen production depends strongly on the heating rate with higher rates favoring nitrogen production. Process effectiveness typically requires a minimum heating rate of 20° C./min.

Typical of the reactions carried out during the decomposition step is the one which follows:

Absorption:

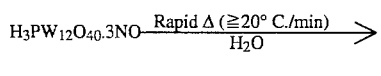

$$H_3PW_{12}O_{40} \cdot 6H_2O + N_2$$

FIG. 1 depicts a representative sorbent/catalyst particle 72 at the decomposition phase of the $NO_x$ to $N_2$ decomposition. The absorbed nitrogen is concentrated in a bulk solid phase 74 where the $NO_x$ partial pressure is on the order of one atmosphere. The $NO_x$ penetrates through an outer, product catalyst layer as the particle is heated. The decomposition phase accordingly takes advantage of the kinetic law of catalyzed $NO_x$ decomposition (which is either first or second order with respect to the partial pressure).

The high partial pressure of the $NO_x$ within the sorbent/catalyst particles results in $NO_x$ decomposition rates 3 to 4 orders of magnitude higher (for first-order kinetics) and 6 to 8 orders of magnitude higher (for second-order kinetics) than the decomposition rates obtained by direct contact between $NO_x$-containing gases and the same heteropoly catalyst. It is also believed that the intimate contact of $NO_x$ and catalyst within the particles may contribute to higher decomposition rates.

The decomposition step of the process will typically be completed by the time the bed 58 of heteropoly compound reaches a temperature in the range of 250°–550° C.

During the decomposition step, the gaseous effluent from reactor 22 is pumped by pump 38 through valve 28 to the system flowmeter (if desired) and through the same valve, valve 42, vent valve 48, and valve 50 to mass spectrometer 32, which may be a UTI Model 100 C. The spectrometer is used to measure the concentration of $N_2$ in the gas discharged from reactor 22.

The following examples demonstrate the efficacy of the present invention and illustrate various aspects of the process.

EXAMPLE I

One representative test of the process, carried out in system 20, employed a feed gas at a temperature of 150° C. and formulated as follows:

| Constituent | Amount |
|---|---|
| NO | 1000 ppm |
| $SO_2$ | 500 ppm |
| $O_2$ | 5% |
| $H_2O$ | 2% |
| He | Balance |

The feed gas was prepared by premixing NO and helium (1.09 volume percent) in unit 24 and then adding the oxygen and sulfur dioxide in the same unit as shown in FIG. 1. The water vapor was added from vapor generator 34.

The premixed NO and He (1.09 percent) was obtained from Scott Specialty Gases. All other gases were from the Linde Division of Union Carbide Corporation: He (high purity grade), $CO_2$ (precision aquarator grade), $O_2$ (extra dry grade), and $SO_2$ (commercial grade). The feed gas employed in the decomposition step contained 1000 ppm NO, 5 percent $O_2$, 2 percent $H_2O$, balance He. The space velocity was 7000 $h^{-1}$, and the flow rate was 386 cc STP/min.

The heteropoly compound was reagent grade powder 12-tungstophosphate, $H_3PW_{12}O_{40} \cdot mH_2O$, supplied by Alfa Products, Ward Hill, Mass. A sample size fraction of 60–80 (0.177–0.25 mm) mesh was used. The net amount of sorbent/catalyst, calculated as $H_3PW_{12}O_{40} \cdot 6H_2O$ and based on thermogravimetric analysis, was 5.5 gms.

The sorbent/catalyst may be a particulate solid with a particle size ranging from −200 mesh to 0.25 in.

The particle size of the heteropoly compound can be expected to have a strong effect on $N_2$ production. Larger sizes should improve $N_2$ production because a longer diffusion path through the catalyst (outer) layer is available. However, large sizes would decrease the NO absorption rate during the $NO_x$ step.

Figure 3A:
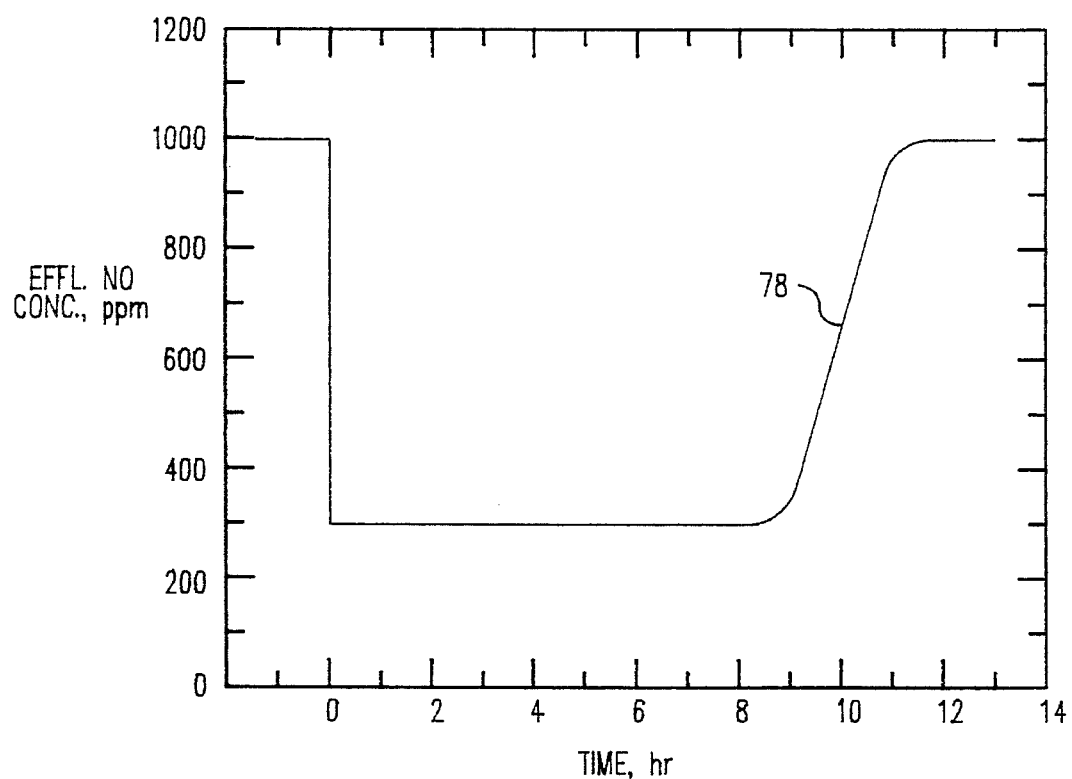
FIG. 3A is a graph of data confirming that $NO_x$ was successfully absorbed from a feedstock gas stream in one representative test carried out in the FIG. 1 system.
Figure 3B:
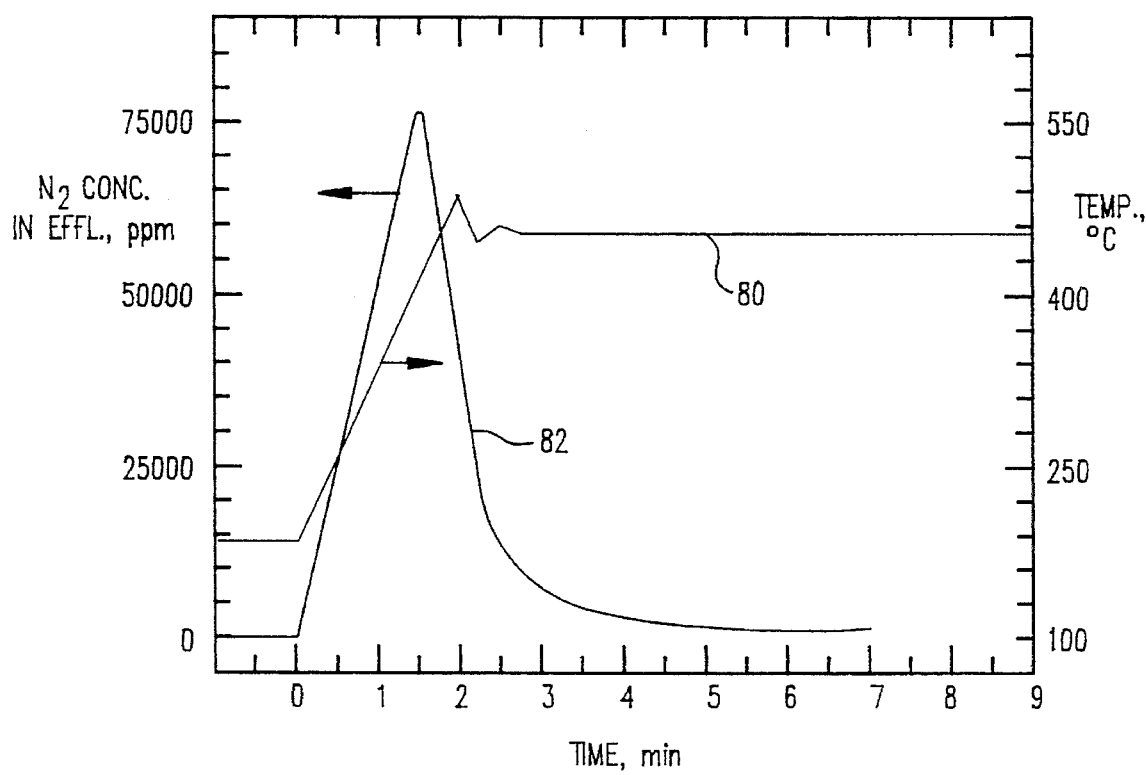
FIG. 3B presents data showing that the sorbed $NO_x$ was successfully decomposed to nitrogen in the second step of the test.

The results of the test are shown graphically in FIGS. 3A and 3B. Curve 78 (FIG. 3A) shows that the test produced a large and almost instantaneous decrease in the NO concentration of the simulated flue gas in the absorption step. Temperature and NO concentration curves 80 and 82 (FIG. 3B) show that the absorbed NO was rapidly and effectively decomposed into nitrogen in the second, rapid heating step of the process.

At a gas hourly space velocity of 5,000 $h^{-1}$ and a temperature of 150° C., 70 percent of the NO in the feed gas (114 cc STP) was absorbed by the fixed bed 58 of heteropoly compound. This amount of NO corresponded to 2.8 NO molecules per Keggin unit ($H_3PW_{12}O_{40}$).

During decomposition at a heating rate of 150° C./min, the total amount of $N_2$ produced was 38.9 cc STP. Since each $N_2$ molecule formed from two NO molecules, 68.3 percent of the NO that was absorbed initially was converted to $N_2$ during decomposition. An overall nitrogen mass balance showed that nearly 50 percent of the NO originally contained in the simulated flue gas was converted into $N_2$ by this two-step cycle.

Figure 4:
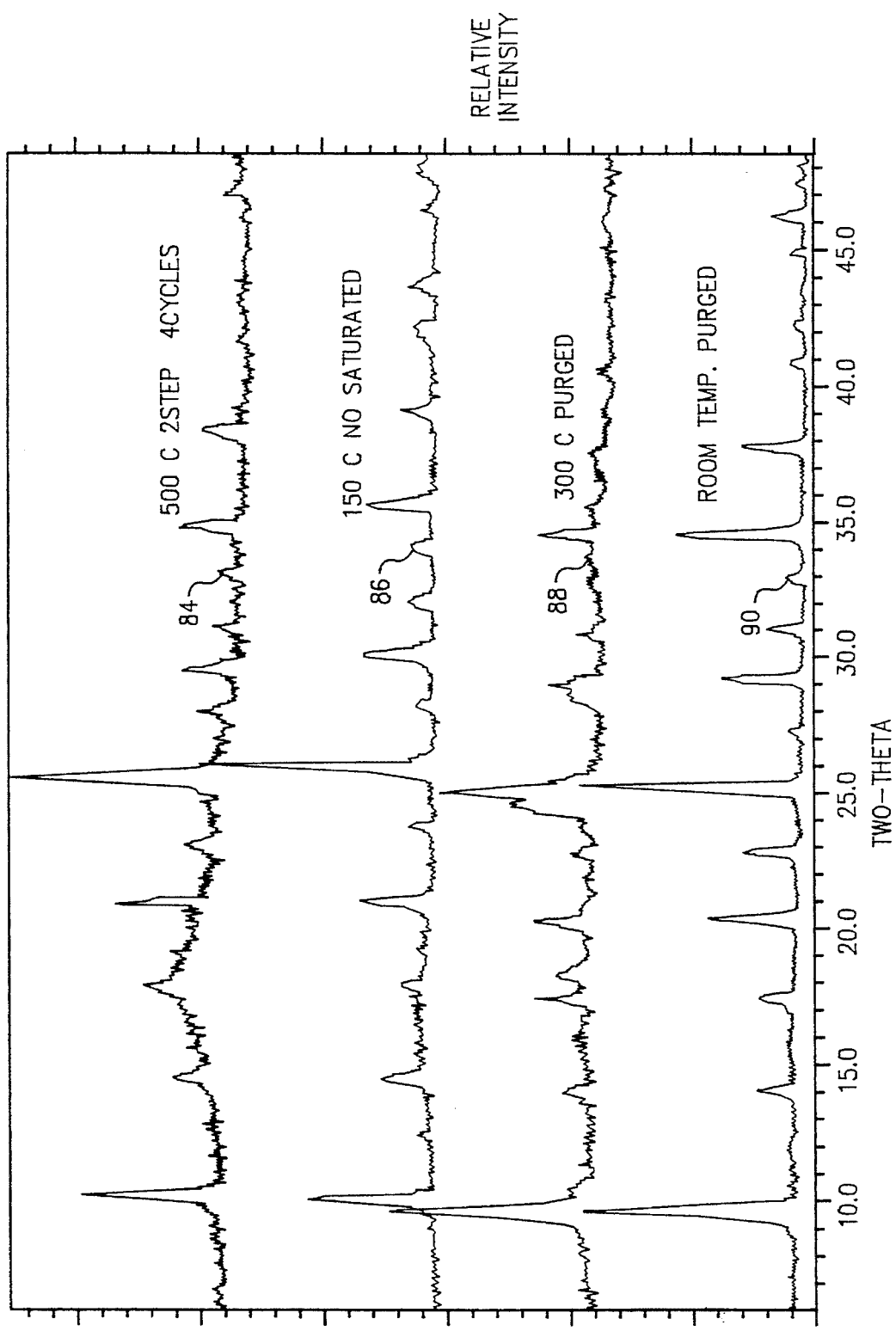
FIG. 4 shows the x-ray diffraction patterns of a representative sorbent/catalyst after having been subjected to a series of process cycles and a variety of process conditions.

As shown in FIG. 4, the decomposition step was very rapid and generally completed before the final temperature (ca 450° C.) was reached. To utilize the catalytic activity of the outer layer in the sorbent/catalyst particles, fast heating rates are necessary. In fact, the heating rate is the single most important factor in determining the amount of $N_2$ produced.

The choice of the 150° C. temperature for NO absorption was based on the practical reason that this temperature is conveniently available in utility combustion systems. The heating rate for decomposition was limited by the capabilities of system 20.

EXAMPLE II

To demonstrate the importance of the heating rate in the decomposition step of the process, the run described in EXAMPLE I was repeated, using different heating rates. The effect of heating rate on $N_2$ production is shown in Table 1.

TABLE 1

| $N_2$ Production By Rapid Heating from 150° C. to 450° C. Expressed as Percent NO Initially Absorbed by $H_3PW_{12}O_{40}$ | |
|---|---|
| Heating Rate, °C./min | $N_2$ Production Percent |
| 50 | 35.4 |
| 100 | 59.6 |
| 150 | 68.3 |

Higher heating rates (° C./min) would be expected to even further increase the $N_2$ production rate. Such heating rates might be obtained in a large scale reactor, for example, by directly contacting the sorbent/catalyst and its burden of absorbed gases with a hot ($\approx 500°$ C.) flue gas. A hot flue gas at that temperature is conveniently available in a boiler utility system at the exit of the economizer.

EXAMPLE III

To demonstrate that the present invention has the enormous advantage of the catalyst not being poisoned by sulfur dioxide or carbon dioxide, the test described in EXAMPLE I was repeated under the following conditions.

| Feed Stream | |
|---|---|
| Temperature | 150° C. and 200° C. |
| NO | 1,000 ppm |
| $O_2$ | 5% |
| $H_2O$ | 5% |
| Space Velocity | 10,000 and 15,000 $h^{-1}$. |

The runs were repeated with the feed stream modified by the addition of 500 and 1000 ppm of $SO_2$ and 1000 and 2000 ppm of $CO_2$ while keeping the concentrations of the other feed stream components the same. The additions of $SO_2$ and $CO_2$ did not produce any observable changes in the concentration of nitrogen oxide in the effluent from reactor 22. This demonstrates that the $SO_2$ and $CO_2$ had no adverse effect on the absorption of the nitrogen oxide into the heteropoly compounds.

In contrast, and as expected from the literature (Ono, Heteropoly Acid Catalysts—A Unique Blend of Acid-base and Redox Properties, *Perspectives in Catalysis,* Blackwell Scientific Publishing, London, 1992, pp. 431–464), an injection of 1,000 ppm of 150° C. ammonia into the feed stream resulted in the NO absorption rate rapidly decreasing to zero. Pyridine and alcohols would similarly be expected to have an adverse effect on nitrogen absorption (Misono, Heterogeneous Catalysis by Heteropoly Compounds of Molybdenum and Tungsten, 29 Catal. Rev.-Sci. Eng., 1987, p. 269). However, in the applications for which the present invention currently shows the most promise—the removal of $NO_x$ pollutants from flue gases, for example—the interference with $NO_x$ absorption is of no practical consequence. Ammonia, pyridine, and alcohols do not appear in flue gases in any significant concentrations, if at all.

EXAMPLE IV

The procedure described in EXAMPLE I was repeated with variations in the temperature and space velocity of the feed stream and in the concentrations of $O_2$ and $SO_2$. The results are summarized in Table 2.

The optimum temperature range for $NO_x$ absorption is shown by Table 2 to be 150°–200° C.

Oxygen has a strong positive effect on $NO_x$ absorption. Increasing $O_2$ concentrations beyond 5 percent appeared to only slightly further increase the NO absorption. Oxygen clearly plays an important role in the bulk substitution reaction.

Water vapor is also necessary in the NO absorption step. When $H_2O$ was cut off in the feed stream, the NO absorption rate declined slowly to zero in about one-half hour. This indicates that the $H_2O$ linkages of the heteropoly sorbent/catalyst removed slowly in a dry atmosphere at the reaction temperature and that the $H_2O$ linkages are necessary for the NO substitution. However, only a minimum amount of water vapor (the above indicated 2 to 5 percent) is needed to retain the water linkages and to sustain NO absorption.

EXAMPLE V

A test involving four complete absorption/decomposition cycles and the same bed of $H_3PW_{12}O_{40} \cdot 6H_2O$ sorbent/catalyst was made to demonstrate that the heteropoly compound remains effective over an extended period of use. A simulated flue gas with 1000 ppm NO, an absorption step temperature of 150° C., and rapid heating to 450° C. in the decomposition step were employed. The X-ray diffraction pattern of the heteropoly compound after the four cycles were compared with the diffraction pattern of the secondary structure ($H_3PW_{12}O_{40}$ with $6H_2O$): (1) after purge with dry He room temperature; (2) after heating at 300° C.; and (3) after NO absorption at 150° C. The results are shown in FIG. 7 in which traces 84, 86, 88, and 90 respectively identify the pattern after the four-cycle test and the patterns after procedures (1), (2), and (3).

The X-ray diffraction patterns show that the secondary structure was preserved. It was also found, that in the samples in which the absorbed NO was subjected to decomposition in dry He, subsequent cooling and exposure to the ambient air restored the water linkages and the secondary structure.

The invention may be embodied in many forms without departing from the spirit or essential characteristics of the invention. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A method of decomposing a nitrogen oxide to nitrogen which comprises the steps of:

providing a heteropoly compound having the formula

TABLE 2

| Feedstream Temperature | 110 | 130 | 150 | 170 | 190 | 210 | 230 | 300 |
|---|---|---|---|---|---|---|---|---|
| Percent Absorption | 5 | 10 | 16 | 22 | 23 | 22 | 22 | 0 |
| $O_2$ (Percent) | 0 | 1.0 | 1.6 | 2.0 | 3.0 | 5.0 | | |
| Percent Absorption | 0 | 7 | 14 | 22 | 32 | 48 | | |
| $H_2O$ (Percent) | 0 | 2 | 5 | 11 | | | | |
| Percent Absorption | 0 | 24 | 24 | 24 | | | | |
| Space Velocity ($h^{-1}$) | | 20,000 | 5,000 | | 10,000 | 7,500 | 5,000 | |
| Percent Absorption* | | 24 | 27 | | 48 | 51 | 70 | |

*$O_2$ concentration = 596 ppm in this series of runs.

$Y_nXM_{12}O_{40}$ or the formula $Y_nXM_{12}O_{40} \cdot mH_2O$ where:

X is phosphorous, arsenic, silicon, germanium, or boron;

M is tungsten, molybdenum, vanadium, or cobalt;

Y is hydrogen or an alkali metal;

n is the number of positive charges required to balance the negative charge of $XM_{12}O_{40}$; and m is 3 to 12;

so effecting contact between said nitrogen oxide and said heteropoly compound as to cause the nitrogen oxide to be absorbed in said compound at a first temperature in the range of 50° to 200° C. to concentrate said nitrogen oxide; and then heating the heteropoly compound and absorbed nitrogen oxide without the addition of a reducing gas to a second temperature in the range of 250° to 550° C. to catalytically decompose the absorbed nitrogen oxide to nitrogen.

2. A method as defined in claim 1 in which the heteropoly compound and absorbed nitrogen oxide are heated from the first temperature to the second temperature at a heating rate of at least 20° C. per minute.

3. A method as defined in claim 1, in which the absorption of the nitrogen oxide in the heteropoly compound is carried out in the presence of oxygen.

4. A method as defined in claim 1 in which the absorption of the nitrogen oxide in the heteropoly compound is carried out in the presence of water vapor.

5. A method as defined in claim 1 in which the heteropoly compound is employed in particulate form.

6. A method as defined in claim 5 in which the particles of heteropoly compound range in size from −200 mesh to 0.25 inch.

7. A method as defined in claim 3 in which the heteropoly compound has the formula $H_3PW_{12}O_{40} \cdot mH_2O$.

8. A method of removing a $NO_x$ pollutant from a gas stream containing said pollutant and one of the group consisting of sulfur dioxide, carbon dioxide, and mixtures of sulfur dioxide and carbon dioxide by a sorption and decomposition process as defined in claim 1.

9. A method of decomposing a nitrogen oxide to nitrogen which comprises the steps of:

providing a heteropoly compound having the formula $Y_3PW_{12}O_{40}$ or the formula $Y_3PW_{12}O_{40} \cdot mH_2O$ where:

Y is hydrogen or an alkali metal; and m is 3 to 12;

so effecting contact between said nitrogen oxide and said heteropoly compound as to cause the nitrogen oxide to be absorbed in said compound at a first temperature in the range of 50° to 200° C. to concentrate said nitrogen oxide; and then heating the heteropoly compound and absorbed nitrogen oxide to a second temperature in the range of 250° to 550° C. to catalytically decompose the absorbed nitrogen oxide to nitrogen.

10. A method as defined in claim 9 in which the heteropoly compound and absorbed nitrogen oxide are heated from the first temperature to the second temperature at a heating rate of at least 20° C. per minute.

11. A method as defined in claim 9 in which the absorption of the nitrogen oxide in the heteropoly compound is carried out in the presence of oxygen.

12. A method as defined in claim 9 in which the absorption of the nitrogen oxide in the heteropoly compound is carried out in the presence of water vapor.

13. A method as defined in claim 9 in which the heteropoly compound is employed in particulate form.

14. A method as defined in claim 13 in which the particles of heteropoly compound range in size from −200 mesh to 0.25 inch.

15. A method of removing a $NO_x$ pollutant from a gas stream containing said pollutant and one of the group consisting of sulfur dioxide, carbon dioxide, and mixtures of sulfur dioxide and carbon dioxide by a sorption and decomposition process as defined in claim 9.

16. A method of decomposing a nitrogen oxide to nitrogen which comprises the steps of:

providing a heteropoly compound having the formula $Y_nXM_{12}O_{40}$ or the formula $Y_nXM_{12}O_{40} \cdot mH_2O$ where:

X is phosphorous;

M is tungsten, vanadium, or cobalt;

Y is hydrogen or an alkali metal;

n is the number of positive charges required to balance the negative charge of $XM_{12}O_{40}$; and m is 3 to 12;

so effecting contact between said nitrogen oxide and said heteropoly compound as to cause the nitrogen oxide to be absorbed in said compound at a first temperature in the range of 50° to 200° C. to concentrate said nitrogen oxide; and then heating the heteropoly compound and absorbed nitrogen oxide to a second temperature in the range of 250° to 550° C. to catalytically decompose the absorbed nitrogen oxide to nitrogen.

17. A method as defined in claim 16 in which the heteropoly compound and absorbed nitrogen oxide are heated from the first temperature to the second temperature at a heating rate of at least 20° C. per minute.

18. A method as defined in claim 16 in which the absorption of the nitrogen oxide in the heteropoly compound is carried out in the presence of oxygen.

19. A method as defined in claim 16 in which the absorption of the nitrogen oxide in the heteropoly compound is carried out in the presence of water vapor.

20. A method as defined in claim 16 in which the heteropoly compound is employed in particulate form.

21. A method as defined in claim 20 in which the particles of heteropoly compound range in size from −200 mesh to 0.25 inch.

22. A method of removing a $NO_x$ pollutant from a gas stream containing said pollutant and one of the group consisting of sulfur dioxide, carbon dioxide, and mixtures of sulfur dioxide and carbon dioxide by a sorption and decomposition process as defined in claim 16.

* * * * *